US006247133B1

(12) United States Patent
Palage et al.

(10) Patent No.: US 6,247,133 B1
(45) Date of Patent: *Jun. 12, 2001

(54) METHOD FOR AUTHENTICATING ELECTRONIC DOCUMENTS ON A COMPUTER NETWORK

(75) Inventors: Michael D. Palage; Frank A. Cona, Jr., both of Jupiter, FL (US)

(73) Assignee: Frank A. Cona, Jupiter, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/442,670

(22) Filed: Nov. 18, 1999

Related U.S. Application Data (63) Continuation of application No. 09/027,766, filed on Feb. 23, 1998, now Pat. No. 6,018,801.

(51) Int. Cl.[7] .................................................. G06F 13/00
(52) U.S. Cl. ............................................................ 713/201
(58) Field of Search ..................... 713/200, 201, 713/202; 709/229; 380/3, 4, 23, 25, 201, 202

(56) References Cited

U.S. PATENT DOCUMENTS

| 4,303,307 | * | 12/1981 | Tureck et al. ........................ 283/91 |
| 4,797,928 | * | 1/1989 | Dykes ...................................... 380/4 |
| 5,093,861 | * | 3/1992 | Graham ................................. 380/23 |
| 5,442,342 | * | 8/1995 | Kung .............................. 340/825.34 |
| 5,844,497 | * | 12/1998 | Gray .............................. 340/825.34 |
| 5,864,623 | * | 1/1999 | Messina et al. ..................... 380/23 |
| 6,018,801 | * | 1/2000 | Palage et al. ....................... 713/200 |

\* cited by examiner

Primary Examiner—James P. Trammell
Assistant Examiner—Pierre E. Elisca
(74) Attorney, Agent, or Firm—Frank A. Cona (57) ABSTRACT

A method for verifying the source of an electronic document located on a computer network, wherein the electronic document is viewed through a Document Viewer, which includes incorporating a document identifier into the electronic document. The document identifier contains identifying information related to the electronic document. A verification signal containing the identifying information and location information related to the location of the electronic document on the computer network is generated with the Document Viewer and is transmitted to a verification computer. The verification computer accesses a data source to retrieve an identification record and a location record for the electronic document. These records are compared with the verification signal, and a reply signal is generated, which is transmitted back to the Document Viewer. If the information in the verification signal does not match the information contained in the information and location records, then an error message may also be generated, which is sent to a designated recipient as notification of the error.

23 Claims, 6 Drawing Sheets

METHOD FOR AUTHENTICATING ELECTRONIC DOCUMENTS ON A COMPUTER NETWORK

This application is a continuation of application Ser. No. 09/027,766, filed Feb. 23, 1998, which is now U.S. Pat. No. 6,018,801.

FIELD OF THE INVENTION

The present invention relates to a method for authenticating electronic documents on a computer network, and particularly to a method for incorporating a document identifier into an electronic document and comparing this document identifier to records stored in a data source to authenticate the author of an electronic document, and more particularly to a method of authenticating World Wide Web documents located on the Internet.

BACKGROUND OF THE INVENTION

The growing proliferation of content providers on large corporate, government, or public computer networks, such as the Internet, has lead to an increase in the amount of false or misleading information present on these networks. This, in turn, has created a need for a workable system for authenticating the electronic documents on these networks, and for preventing authors from improperly presenting that their content has been reviewed and/or verified by the appropriate authority. This problem is explained below in more detail in regard to the Internet.

The Internet is a vast "network of networks" connecting a large number of computer networks and sub-networks to each other through several regional backbone systems. The Internet is a "decentralized" network, which means that each computer on the network can communicate with each other computer on the network and can do so without communicating with a central computer. The Internet is a "packet-switched" network, which means that information is transmitted among each of the computers using "packets" of data which are routed from one system to the next. One portion of the Internet, the World Wide Web ("Web"), is growing at a rapid pace, as more and more businesses go online.

The Web is the most popular segment of the Internet today because it allows users to interact with each other and access content through a graphical user interface, or "GUI." The most commonly used GUI's are Web browsers, which are software applications that allow users to access and view electronic documents in a browser window. Web documents are created using Hypertext Markup Language ("HTML"), which allows authors to added special format tags to plain text documents to control the appearance of the text in the Web browser. HTML tags also allow for the insertion of additional components into the Web document, such as image files, audio files, and "applets." Applets are small pieces of programming code that are run on the user's computer when downloaded. Applets allow for such effects as scrolling text and animation.

Hypertext links may also be added to a Web document to allow users to access another document, file, or application directly from the browser window. When a hypertext link is activated, the Web browser sends a request to the location where the linked document is stored, which is received by the Web server operating at that location. This is accomplished by using the Hypertext Transfer Protocol ("HTTP") which is special instruction protocol used for transferring information over the Web. The location of the document is specified by the document's universal resource locator ("URL"). For example, "http://www.ipwarehouse.com/Cyber_Registry.html".

The total number of Web documents and Web sites (locations on the Internet where businesses, organizations, or individuals store their Web documents for viewing over the Internet) is increasing exponentially. This fact, coupled with the relative ease with which these documents can be created and made available, and the relative anonymity available to their authors, it has been an increasing problem that a growing portion of Web pages may contain false or misleading information, which can be a danger to the public and harmful to other businesses and organizations.

For example, a Web site or document providing false or misleading medical information as to the effects or proper use of medication could be potentially devastating if relied upon. A Web site which contains misleading legal information could also be harmful to the public. It is possible to cite similar examples from every segment of society.

Accordingly, a system is needed whereby users could authenticate the author of a Web document and determine whether the content of the Web document has been reviewed and/or verified by the appropriate authority. Such a system must be easily accessible by and readily apparent to users, and must be supported by the laws and regulations applicable to the nature of the content in that Web document.

OBJECTS OF THE INVENTION

It is, therefore, an object of the present invention to provide a system for authenticating electronic documents on a computer network, such as the Internet.

It is another object of the invention to detect unauthorized electronic documents which are improperly presented as being properly reviewed and/or verified by the appropriate authority.

It is a further object of the invention to detect unauthorized electronic documents which are improperly presented as being properly reviewed and/or verified by the appropriate authority and to automatically notify this authority of the details of this unauthorized use.

Another object of the invention is to prevent authors of electronic documents from improperly presenting their electronic documents as having been properly reviewed and/or verified by the appropriate authority.

Further objects of the present invention will become apparent to those of ordinary skill in the art based on the disclosure of the invention herein and in the appended claims.

SUMMARY OF THE INVENTION

The present invention includes a method for verifying the source of an electronic document located on a computer network. A document identifier is incorporated into the electronic document, which contains identifying information related to the electronic document and/or the document identifier. An information request signal is generated and is transmitted to an information storage system which contains information about the electronic document and/or the document identifier, such as location information designating the location of the electronic document on the computer network.

A reply signal is then generated and returned based upon a comparison of the information request signal with the information about the electronic document.

In another embodiment of the invention, a verification signal containing the identifying information and location information related to the location of the electronic document on the computer network is generated when the document identifier is activated, and is transmitted to a verification computer or server.

The verification server accesses a data source to retrieve an identification record and a location record for the electronic document. These records are compared with the verification signal, and a reply signal is generated, which is transmitted back to the document viewer. If the information in the verification signal does not match the information contained in the information and location records, then an error message may also be generated, which is sent to a designated recipient as notification of the error.

DESCRIPTION OF THE PREFERRED EMBODIMENT

The present invention will be understood more fully from the detailed description given below and from the accompanying drawings of preferred embodiments of the invention which, however, should not be taken to limit the invention to a specific embodiment but are for explanation and understanding only.

Figure 1:
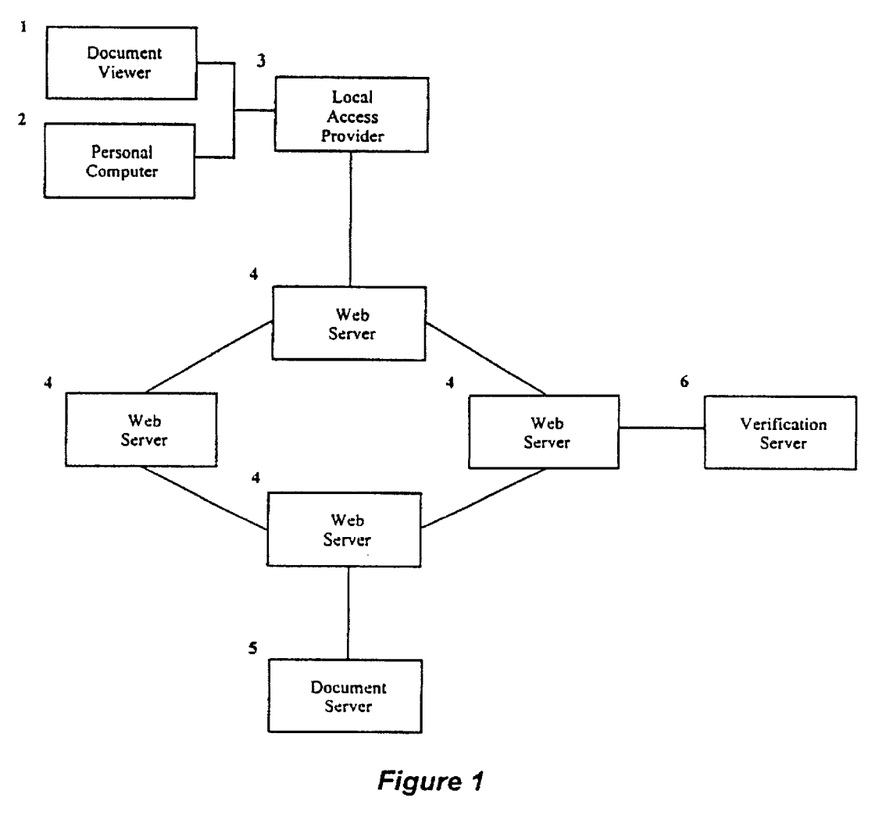
FIG. 1 is a schematic illustration of components used in a preferred embodiment of the present invention operated over the Internet.

FIG. 1 is a schematic demonstrating the typical components used in a preferred embodiment of the invention when used over the Internet. An electronic document, such as a Web page created using HTML, is loaded into Document Viewer 1. Document Viewer 1 may be any software application capable of viewing electronic documents and loading additional electronic documents from within the original document, such as through the use of a hypertext link (although not limited thereto).

For example, the Document Viewer could include a Web browser, such as Navigator from Netscape Communications or Microsoft's Internet Explorer, or could be a word processing application with hypertext capabilities, such as Corel's WordPerfect 8.0 or Microsoft Word '97.

The electronic document may be loaded automatically when Document Viewer 1 is first started, or may be opened into the viewer by the user from a file stored locally or at a remote URL. For example, the user may load the document by typing the document's URL into the Web browser's command line. This will be explained in more detail in regard to FIGS. 2 and 3.

Document Viewer 1 may be accessed by the user through any of a number of computer systems, such as through the use of a terminal connected to a main-frame system, from a personal computer, or over computer connected to a local computer network.

Document Viewer 1 is connected to the Internet along with other Document Viewers and computers, such as Personal Computer 2, through Local Access Provider 3. This connection is typically made through local telephone lines using an analog or ISDN modem, though it can be over a direct network connection, such as an EtherNet network. Local Access Provider 3 maintains a computer network which routes any requests from Document Viewer 1 to the appropriate location on the Internet. This is accomplished in a conventional manner, such as through the use of a modem pool connected to a local server and Internet gateway (not shown). Local Access Provider 3 connects Document Viewer 3 to Web Server 4 through any of a number of well-known connection schemes, such as through the use of leased lines.

Web Server 4 is typically a software application running on a remote computer which is capable of forwarding or processing HTTP requests from Document Viewer 1. For example, Web Server 4 may include any one of a number of well-known server applications, such as the NSCA Web server, the Apache Web server, etc. Web Server 4 passes a document request from Document Viewer 1 to Document Server 5, which is the Web server at the location specified in the requested document's URL.

The transfer of electronic documents between Document Server 5 and Document Viewer 1, and the authentication of documents using Verification Server 6 will be discussed in more detail in regard to the method of the present invention described in connection with FIG. 2.

Figure 2:
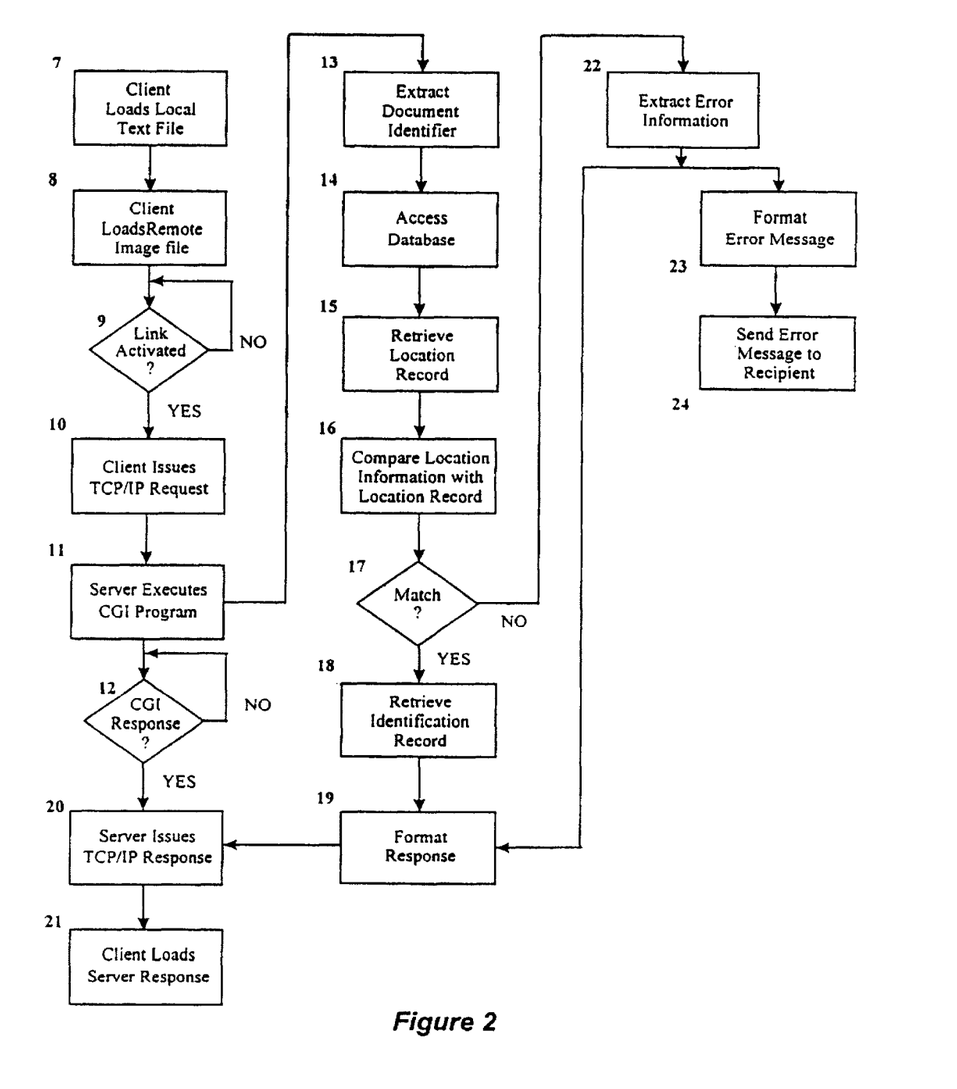
FIG. 2 is a flow chart illustrating a preferred embodiment of the present invention.
Figure 3A:
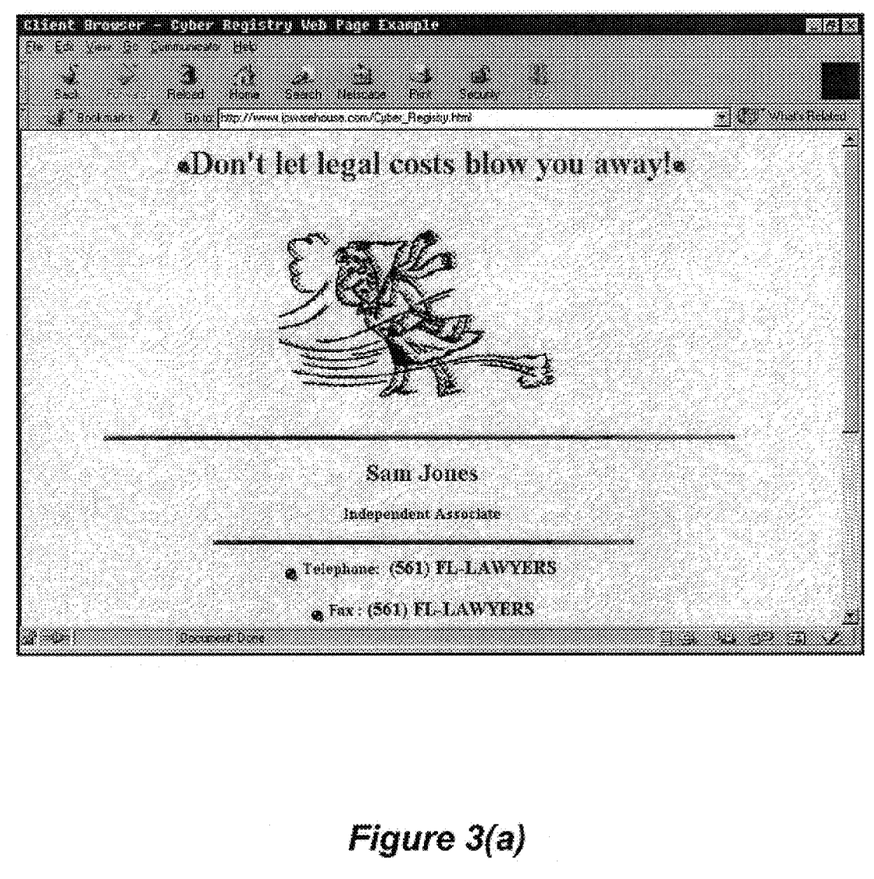
FIGS. 3(a) and 3(b) are screen shots demonstrating an electronic document incorporating an embodiment of the document identifier of the present invention.
Figure 3B:
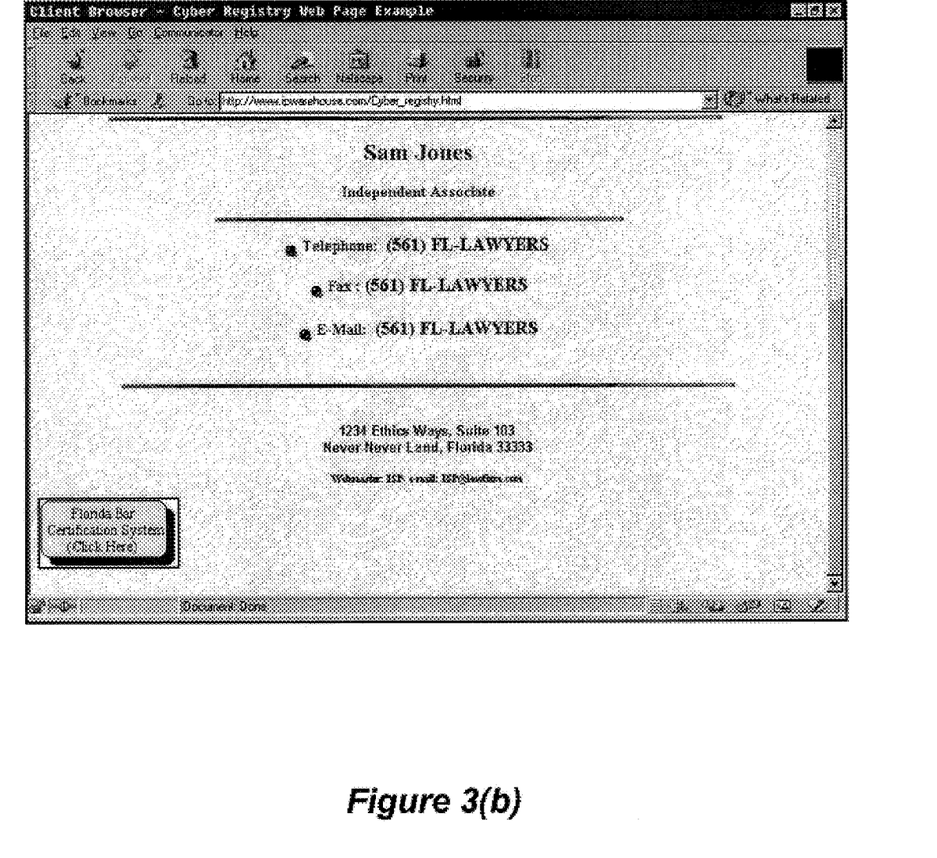

FIG. 2 is a flow chart illustrating one preferred embodiment of the present invention. In this embodiment, Document Viewer 1 first loads a Web document to be authenticated. This is typically accomplished in two stages. The HTML text of the document is loaded by Document Viewer 1, the Client, into the viewing window (7) from Document Server 5. To accomplish this, Document Viewer 1 sends an HTTP request to Document Server 5. This request is transmitted from Document Viewer 1 across the Internet though Local Access Provider 3 and Web Server 4 to Document Server 5. This request is transmitted using the Transmission Control Protocol/Internet Protocol, or "TCP/IP."

Information is transmitted over the Internet using TCP/IP. With this protocol, each location on the Internet, typically a specific computer or Web server, has its own unique IP (Internet Protocol) address, such as "204.108.253.101". This address identifies where that computer or server is located on the network.. Because of the difficulty in remembering a large number of such addresses, a system known as the Domain Name Service ("DNS") was developed to associate an IP address with a particular host in a given "domain." For example, the host "www.ipwarehouse.com" is the host name for a Web server located at the IP address "204.108.253.101". This server is part of the domain "ipwarehouse.com".

Documents located in this domain are "mapped" by the Web server to a particular location in that system. This may or may not be on the same computer as the Web server itself. This document mapping provides a path in that domain to the desired document. For example, if the document "Cyber_Registry.html" is located in the base, or "root" directory of the domain under the host "www.ipwarehouse.com" , its location would be "www.ipwarehouse.com/Cyber_Registry.html". If "Cyber_Registry.html" is a Web document, it will be accessed with the HTTP protocol. Its URL would then be "http://www.ipwarehouse.com/Cyber_Registry.html".

In order to access this document, a user would activate this document's URL. This can be accomplished, for example, by activating a hypertext link having this URL as a target, or by entering the URL in the Command Line of a Web browser. When the URL is activated, the Web browser issues the HTTP request to the appropriate Web server to serve up the desired document.

A hypertext link is created by entering a special HTML tag set into the text of the Web document. For example the following text would create a link to a Web document named "Cyber_Registry.html":

<A HREF="http://www.ipwarehouse.com/Cyber_Registry.html">Click here to retrieve Cyber_Registry.html.</A>

In the above example, the language "Click here to retrieve Cyber_Registry.html" would appear in the Web browser, and would be designated as a hypertext link, such as by underlining or a special color. The HTML tag set is the text enclosed in the "< >" tags. "A" signifies that the enclosed text is a hypertext "anchor", "HREF" signifies that the text after the "=" is the hypertext reference for the URL of the desired document, and the "/A" in the closing tag designates that it is end of the hypertext link.

A Web document may contain text only, text only with HTML formatting tags and/or links, or may include other documents, such as image files, audio files, and applets. For example, the Web document illustrated in FIGS. 3(a) and 3(b) is contains formatted text, several image files, and a hypertext link. The hypertext link is designated by the icon in the lower left corner containing the phrase "Cyber Registry Web Page Certification System". By clicking on this image, the user will activate the target document for that hypertext link.

In a preferred embodiment of the invention, the electronic document to be authenticated will include a document identifier which may include identifying information about the electronic document and/or the document identifier. For example, the document identifier may comprise an image file and hypertext link. This image file may be located on Document Server 5, Verification Server 6, or another designated Web server. When client Document Viewer 1 loads the HTML text file for the electronic document to be authenticated, this image file is also loaded in Document Viewer 1.

By way of example, if the document to be authenticated is "http://www.ipwarehouse.com/Cyber_Registry.html", then that document could incorporate the image file and hypertext link by including the appropriate text in the HTML code for the document itself. In the Web document shown in FIGS. 3(a) and 3(b), the HTML text file contains the code shown in Appendix 1, attached hereto and incorporated by reference herein.

As can be seen from Appendix 1, the HTML code includes the following text:

<P><!—The following link and logo are licensed products of the IP Warehouse, Inc., and are part of the Cyber Registry(tm) Web page certification system. All rights reserved.—>
<a href="http://www.ipwarehouse.com/cgi-shl/Cyber_Registry.pl?&id=CR1"><IMG SRC="http://www.ipwarehouse.com/CR_cert.jpg" width=135 height=65></a></P>

The HTML tag <IMG SRC="http://www.ipwarehouse.com/CR_cert.jpg">directs Document Viewer 1 to load the image file "CR_cert.jpg" from the Web server at "www.ipwarehouse.com" (reference numeral 8 in FIG. 2). In a preferred embodiment of the invention this image file is a digital representation of a special "certification mark" belonging to the authority responsible for reviewing and/or verifying content of the type disclosed in the Web document. A certification mark is a special type of trademark used by an organization to certify to the public that the goods that it is affixed to has met certain standards established by that organization.

The Web document shown in FIGS. 3(a) and 3(b) is an example of a legal advertisement for an attorney. Under the laws of a number of states, such an advertisement must be reviewed by that state's bar association before it is made publicly available. In addition, some states require that attorney's provide certain information about themselves to the state bar in connection with the advertisement they wish to run, such as the name of the firm, a contact person, and their address and telephone number.

In this situation, the image file appearing in the lower left corner would be the certification mark used by the state bar association for such purposes, such as the official seal of that organization. Users viewing that advertisement would then know that it has been properly reviewed and the information contained therein is accurate and authentic.

After the Web document is loaded into Document Viewer 1, Document Viewer 1 waits until the hypertext link is activated, or until the user accesses another URL (9). When a user activates the document identifier by clicking on the hypertext link embodied in the certification mark image file; Document Viewer 1 generates a signal to Verification Server 6 (10). This is preferably in the form of an HTTP request sent over the Internet using TCP/IP. The request is routed through Local Access Provider 3 and Web Server 4 to Verification Server 6.

The HTTP request may include both identifying information about the electronic document and/or the document identifier, and location information about where the document actually located on the Internet, i.e., the location of the document on Document Server 5. In the example shown in FIGS. 3(a) and 3(b), this location information would be included in the HTTP request. That is, the URL for document containing the hypertext link used to generate the request would be included in the HTTP request itself. The HTTP request may also include special identification information appended to the hypertext reference contained in the link. For example, in the HTML code shown in Appendix 1, this identification information for be "?&id=CR1", which is appended to the URL for the requested document, "http://www.ipwarehouse.com/cgi-shl/Cyber_Registry.pl". This information, known as a "key pair" would be encoded in the URL information sent in the HTTP request.

It will be appreciated that the details of HTTP operation in conjunction with TCP/IP are well known to those of ordinary skill in the art and will, therefore, not be elaborated on here.

When the HTTP request is received by Verification Server 6, Verification Server 6 accesses a data source to retrieve a location record based upon the document identifier contained in the verification signal from Document Viewer 1. Of course, it is also possible to have multiple location records for each document identifier, allowing for use of the document identifier with more than one electronic document and at more than one location.

In the preferred embodiment of the invention demonstrated in FIG. 2, Verification Server 6 would receive the HTTP request from Document Viewer 1, parsing the Request to determine the desired document. In this embodiment, the requested document is a common gateway interface, or CGI program, designated as "Cyber_Registry.pl" in this example. This program acts as an interface between the server and the data source by executing a set of instructions based upon the information received by the server in the HTTP request and passed by the server to the CGI program. Verification Server 6 executes the CGI program and waits for the CGI program to return a response (12).

The CGI program can take a number of forms which are well known in the art, such as PERL scripting, C++ modules, or other common programming languages. The interaction of Web servers and CGI programs and the sending of information therebetween is well known to those of ordinary skill in the art.

The CGI program may extract the document location information, e.g. the URL, from the information passed to it by the server and retrieve the location record or records from the data source (13–14). This may be accomplished in a number of ways known to those of ordinary skill in the art. For example, if the CGI program is a PERL script, a database access module, such as AnyDBM_File, can be used in connection with any number of database packages, such as NDBM_File, DB_File, GDBM_File, SDBM_File, or ODBM_File, to interface with the majority of commercial relational database applications. Examples of such databases include Oracle, Sybase, Microsoft Access, etc.

Records are retrieved by passing SQL statements to the database and loading the results into the CGI program. The CGI program may then compares the location records retrieved from the database with the location information received from the server (16). This can be accomplished, for example, by a simple text string comparison of the URL in the HTTP request with a URL stored in the location record. Of course, this comparison is not limited thereto and can be-accomplished by other means well known to those of ordinary skill in the art, such as a checksum comparison of information contained in the document itself and reference information stored in the database.

Figure 4A:
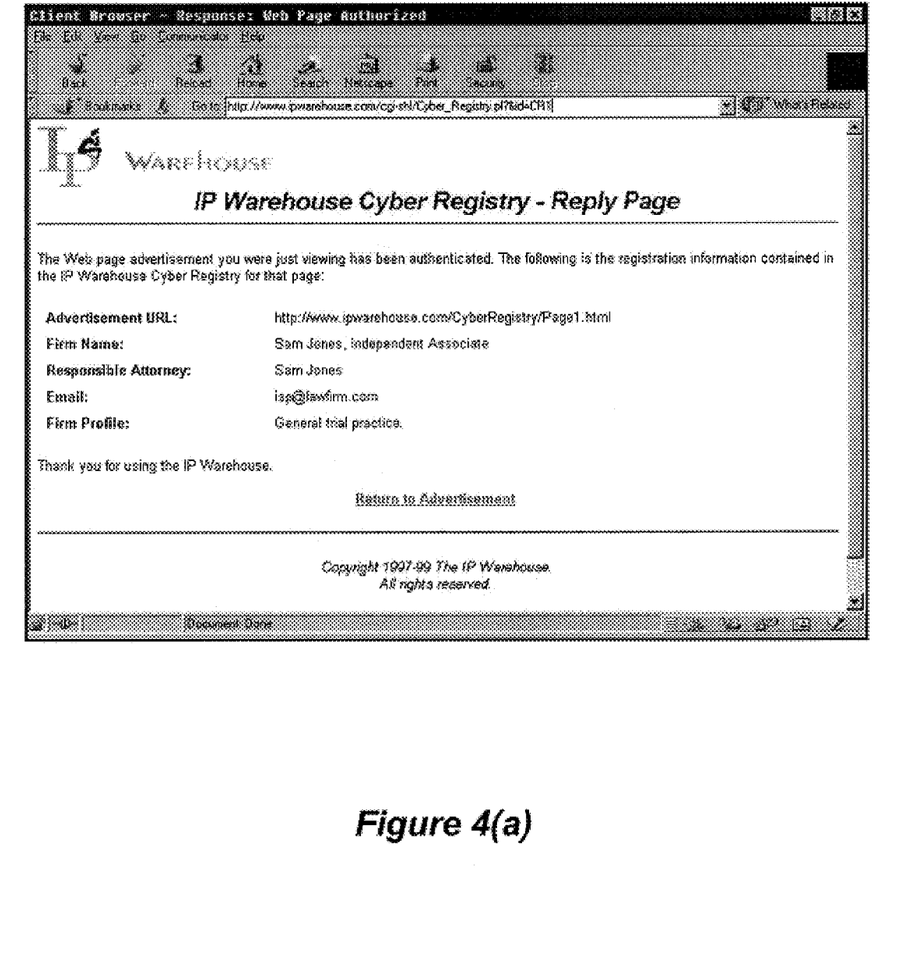
FIGS. 4(a) and 4(b) are screen shots demonstrating Web page responses in a preferred embodiment of the present invention.

If the location information matches one of the acceptable locations, then the CGI program retrieves an identification record for that location from the database (17–18). The CGI program then formats a an appropriate response, which is then sent back to the server (19). In the example shown in FIGS. 3(*a*) and 3(*b*), this response might include, for example, the required information provided to the state bar association when the advertisement was presented for review. The server then serves this response to Document Viewer 1 using TCP/IP (20). The response is loaded into the viewing window by Document Viewer 1 to be read by the user (21). An example of such a response is shown in FIG. 4(*a*).

In a preferred embodiment of the invention, if the location information does not match the location records retrieved from the database, then the CGI program may extract the information provided by the server from the HTTP request, including but not limited to the document location, the document server, the IP address of the user requesting the document, the document identifier, and the time and date of the request. It will be appreciated that manner of the inclusion of this information in the HTTP request is well known to those of ordinary skill in the art, such as through the use of environment variables encoded in the URL sent as part of the HTTP request.

Figure 4B:
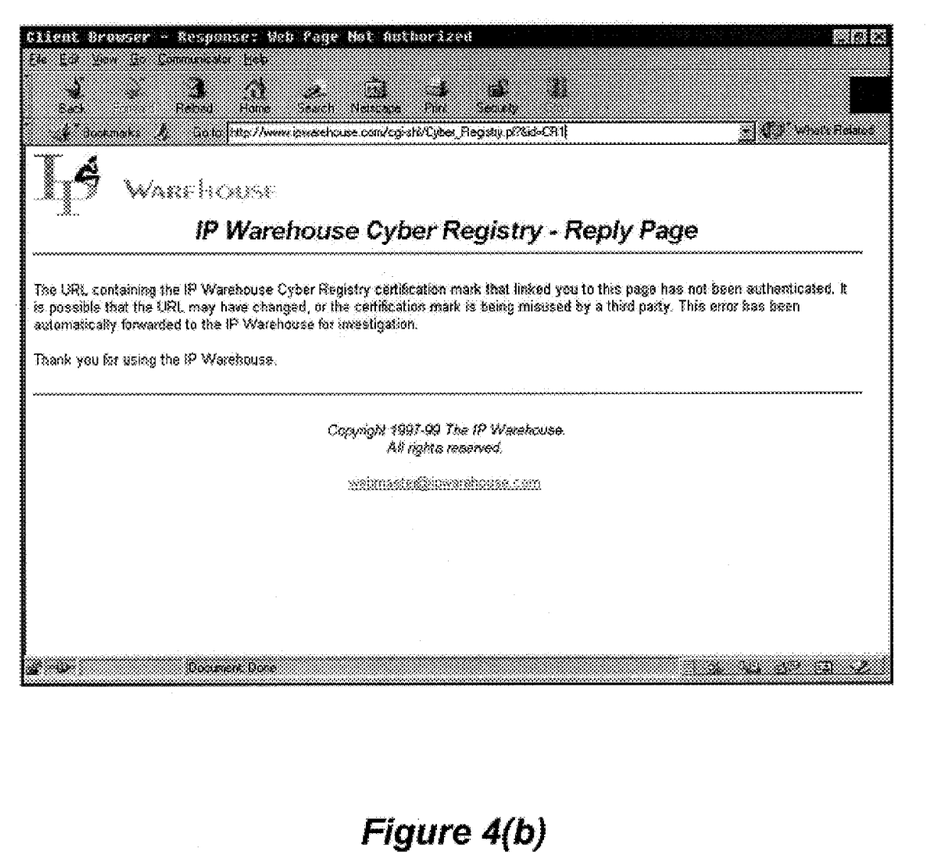

This error information may then be formatted as an error message (23), which is sent to a designated recipient (24). For example, the error information can be formatted as an email message which is then sent to a designated email address. This particular embodiment can be accomplished by a number of means well known to those of ordinary skill in the art. If the CGI program is a PERL script, for example, then this can be done using native function calls if the program is being run on a UNIX operating system, or by calling an executable file from the command line such as Postmail from Software.com. The CGI program may also format an error message to return to Document Viewer 1 in the form of a Web document. An example of such a response is shown in FIG. 4(*b*). In other embodiments of the invention, the error information may also be stored in the database itself, or written to a text file for later view. The error information may be written to the database in manner similar to that used for retrieving the identification and location records. For example, if the CGI program is a PERL script, an SQL statement can be used in connection with the database modules discussed above. Notification that an error has occurred may also be sent by email to a designated email address. As an alternative to email, a response may be sent via facsimile or through an automated voice mail system. Incorporating such communication means into a CGI program is well known to those of ordinary skill in the art and can be accomplished with a number of currently available software applications.

Alternatively, the CGI program may extract the identifying information from the HTTP request sent by the server and use this information to extract the corresponding information from the data source without comparing the information or location records This information may then be formatted by the CGI program into an appropriate electronic document and returned to this browser.

In a further embodiment of the invention, a blocking mechanism may be utilized to prevent unauthorized replication of the document identifier. This provides the significant benefit in that it greatly reduces the possibility that unauthorized users will be able to falsify an association with the authority involved, and greatly increases the chances that such a misuse will be detected.

There are a number of blocking mechanisms which may be incorporated for such use. One possible embodiment entails the use of an applet which is downloaded when the electronic document is loaded into Document Viewer 1. This applet detects when a user is attempting to save an image file contained in a Web document onto their computer and prevents the Web browser from allowing the save to occur. This can be accomplished, for example, though the use of a Java script or ActiveX control.

A Java applet may be incorporated in the text of the Web document itself, or may be called by a reference to a URL in a manner similar the inclusion of image files in Web documents. Instead of loading the image file directly, Document Viewer 1 loads the Java applet set forth in the Web document. The applet then contacts the location where the image file is stored (preferably Verification Server 6) and loads the image file into the viewer window. However, the image file is assigned to the applet and is not directly accessible by Document Viewer 1. Thus, the image saving features of Document Viewer 1 cannot be used to save the document.

It will be appreciated that there a number of ways, well known to those of ordinary skill in the art, that such an applet can be created. For example, the Java programming language can be used to control access to the image file by the server through the server's native application program interface ("API").

Other embodiments of the invention may include encoding document information into the image file itself. For example, cryptography and steganographic systems may be employed to place a special digital watermark into an image file containing the identification information for the document identifier. Such systems are described in U.S. Pat. Nos.

5,687,236 and 5,633,929, the content of which is incorporated by reference herein.

These systems can be used to encode data directly into the image file. If the image file is improperly taken and used- by an author in an electronic document on Document Server 5, this can be detected by Verification Server 6 through a comparison of the information encoded in the image file with that stored in the data source. When the hypertext link is activated and the verification signal is sent to Verification Server 6, Verification Server 6 may retrieve the image file from Document Server 5 by issuing an HTTP request to that server. When the image file is received, Verification Server 6 decrypts the encoded information and compares it with the information stored in the data source. This may be accomplished through the use of a CGI program, as discussed above.

Although this invention has been described with reference to particular embodiments, it will be appreciated that many variations may be resorted to without departing from the spirit and scope of this invention. For example, the invention may be utilized on any computer network, such as corporate Intranets and other internetworked systems, and is not limited to the Internet or the World Wide Web. It will also be appreciated that many combinations of Web servers and CGI applications may used for accessing the data source, and the data source may be other than a relational database, such as an ACSII text file, or some other type of binary file. Also, if HTML code is used to contain the document identifying information, this information may take a variety of forms other than the URL encoded key pairs described herein, such as hidden variable in the HTML code.

What is claimed is:

1. A method for authenticating the source of an electronic document located on a computer network comprising the steps of:
   (a) incorporating a document identifier into said electronic document, said document identifier having identifying information related to said electronic document;
   (b) generating a verification signal, said verification signal containing said identifying information related to said electronic document and location information related to the location of said electronic document on said computer network;
   (c) transmitting said verification signal to a verification system;
   (d) accessing a data source with said verification system, said data source containing information about said electronic document;
   (e) comparing said verification signal with said information about said electronic document;
   (f) generating and sending a reply signal based upon said comparison of said verification signal with said information about said electronic document stored in said data source.

2. The authentication method of claim 1, wherein said document identifier is stored in said verification system and is incorporated into said electronic document when said electronic document is loaded into said document viewer.

3. The authentication method of claim 1, wherein said verification system comprises a Web server operating on a computer.

4. The authentication method of claim 1, wherein said document identifier contains a blocking mechanism, said blocking mechanism preventing said document viewer from replicating said document identifier.

5. The authentication method of claim 1, wherein said document identifier is a digital image file and associated computer code.

6. The authentication method of claim 5, wherein said identifying information related to said electronic document is encoded into said image file.

7. The authentication method of claim 1, wherein said information about said electronic document includes at least one location record regarding the location of said electronic document on said computer network, said method further comprising the steps of:
   (h) determining if said location record is the same as said location information contained in said verification signal;
   (i) generating and error signal if said location information in said verification signal is not the same as said location record; and
   (j) returning an error response based upon said error signal.

8. The authentication method of claim 7 further comprising the step of transmitting said error signal to a second designated location on said computer network.

9. The authentication method of claim 7 further comprising the step of saving said error signal as a record in said data source.

10. In a method for verifying the source of an electronic document located on a computer network capable of being viewed through a document viewer, said method comprising the steps of:
    (a) incorporating a document identifier into said electronic document from a verifying computer when said electronic document is loaded into said document viewer, said document identifier having identifying information related to said electronic document;
    (b) generating a verification signal with said document viewer, said verification signal containing said identifying information related to said electronic document and location information related to the location of said electronic document on said computer network;
    (c) transmitting said verification signal to a verification server;
    (d) accessing a data source with said verification server, said data source containing information about said electronic document;
    (e) comparing said verification signal with said information about said electronic document stored in said data source;
    (f) generating a reply signal based upon said comparison of said verification signal with said information about said electronic document stored in said data source; and
    (g) transmitting said reply signal to said document viewer.

11. The authentication method of claim 10, wherein said document identifier contains a blocking mechanism, said blocking mechanism preventing said document viewer from replicating said document identifier.

12. The authentication method of claim 10, wherein said document identifier is a digital image file and associated computer code.

13. The authentication method of claim 12, wherein said identifying information related to said electronic document is encoded into said image file.

14. The authentication method of claim 10, wherein said information about said electronic document includes at least one location record regarding the location of said electronic document on said computer network, said method further comprising the steps of:
    (h) determining if said location record is the same as said location information contained in said verification signal;

(i) generating an error signal if said location information in said verification signal is not the same as said location record; and (j) creating an error response based upon said error signal; and (k) transmitting said error response to said document viewer.

15. The authentication method of claim 14, further comprising the step of transmitting said error signal to a second designated location on said computer network.

16. The authentication method of claim 14, further comprising the step of saving said error signal as a record in said data source.

17. In a method for authenticating the source of an electronic document located on a computer network and being viewed through a document viewer, said method comprising the steps of:

(a) incorporating a document identifier into said electronic document when said electronic document is loaded into said document viewer, said document identifier having identifying information related to said electronic document;

(b) generating a verification signal with said document viewer, said verification signal containing said identifying information related to said electronic document and location information related to the location of said electronic document on said computer network;

(c) transmitting said verification signal to a verification server;

(d) accessing a data source with said verification server, said data source containing at least one identification record for said electronic document and at least one location record for said electronic document on said computer network;

(e) retrieving said location record from said data source;

(f) comparing said verification signal with said location record;

(g) determining if said location record is the same as said location information contained in said verification signal;

(h) if said location information in said verification signal is not the same as said location record, generating an error signal, creating an error message, and transmitting said error message to said document viewer and to a second designated location on said computer network; and (i) if said location information in said verification signal is the same as said location record, retrieving said information record from said data source, generating a reply signal based upon identification record and said location record, and transmitting said reply signal to said document.

18. The authentication method of claim 17, wherein said document identifier contains a blocking mechanism, said blocking mechanism preventing said document viewer from replicating said document identifier.

19. The authentication method of claim 17, wherein said identifying information related to said electronic document is encoded into said image file.

20. The authentication method of claim 17, further comprising the step of saving said error signal as a record in said data source.

21. A method for authenticating an electronic document located on a computer network comprising the steps of:

(a) incorporating a document identifier into said electronic document;

(b) generating an information request signal based upon said document identifier in said electronic document;

(c) transmitting said information request signal to an information storage system containing information about said electronic document;

(e) comparing said information request signal with said information about said electronic document contained in said information storage system;

(f) generating and sending a reply signal based upon said comparison.

22. The authentication method of claim 21, wherein said document identifier is a digital image file and associated computer code.

23. The authentication method of claim 22, wherein said information about said electronic document is encoded into said image file.

* * * * *